United States Patent [19]
Gustafson

[11] Patent Number: 5,664,889
[45] Date of Patent: Sep. 9, 1997

[54] FLUID DYNAMIC BEARING WITH LOW STIFFNESS CHANGE OVER TEMPERATURE

[75] Inventor: John Robert Gustafson, Los Gatos, Calif.

[73] Assignee: Seagate Technology, Inc., Scotts Valley, Calif.

[21] Appl. No.: 626,890

[22] Filed: Apr. 3, 1996

[51] Int. Cl.⁶ .................................................. F16C 17/10
[52] U.S. Cl. ........................... 384/114; 384/100; 384/278; 384/905
[58] Field of Search .................................. 384/114, 100, 384/278, 905, 107, 115

[56] References Cited

U.S. PATENT DOCUMENTS

| | | | |
|---|---|---|---|
| 3,951,234 | 4/1976 | Fisher | 384/103 |
| 4,596,474 | 6/1986 | Van Roemberg | 384/114 |
| 5,054,297 | 10/1991 | Tanaka et al. | 384/100 |
| 5,224,782 | 7/1993 | Miwa et al. | 384/100 |

Primary Examiner—Lenard A. Footland
Attorney, Agent, or Firm—Flehr Hohbach Test Albritton & Herbert LLP

[57] ABSTRACT

A fluid dynamic bearing is described having an inner element made of a first material with a first coefficient of thermal expansion, an outer element made of a second material with a second coefficient, and a layer of viscous fluid in contact with and separating the inner element from the outer element such that said outer element is capable of rotation around said inner element. By choosing particular materials, the difference between the first and second coefficients of thermal expansion can be controlled, and the thickness of the layer of viscous fluid can be made to vary with temperature. This allows for some degree of control over the temperature dependence of the stiffness and drag of the fluid dynamic bearing. In particular, the coefficients of thermal expansion can be chosen so as to cancel out any temperature dependence of stiffness and/or drag due to a temperature dependence of the viscosity of the viscous fluid.

19 Claims, 7 Drawing Sheets

FIG. 3 FDB MOTOR CROSS-SECTION

FLUID DYNAMIC BEARING WITH LOW STIFFNESS CHANGE OVER TEMPERATURE

FIELD OF THE INVENTION

The present invention is directed to fluid dynamic bearings. More particularly, the present invention pertains to a fluid dynamic bearing with a low stiffness and/or drag change over temperature, allowing the fluid dynamic bearing to be used for applications which require a relatively constant stiffness and/or drag, and where the temperature varies over a significant range.

BACKGROUND OF THE INVENTION

Disk drives are commonly used in workstations, personal computers, laptops and other computer systems to store large amounts of data in a form that can be made readily available to the user. In general, a disk drive comprises a magnetic disk that is rotated by a spindle motor. The surface of the disk is divided into a series of data tracks. The data tracks are spaced radially from one another across a band having an inner diameter and an outer diameter. Each of the data tracks extends generally circumferentially around the disk and can store data in the form of magnetic transitions within the radial extent of the track on the disk surface. Typically, each data track is divided into a number of data sectors that store fixed sized data blocks.

A head includes an interactive element, such as a magnetic transducer, that is used to sense the magnetic transitions to read data, or to transmit an electrical signal that causes a magnetic transition on the disk surface, to write data. The magnetic transducer includes a read/write gap that positions the active elements of the transducer at a position suitable for interaction with the magnetic transitions on the surface of the disk, as the disk rotates.

As known in the art, the magnetic transducer is mounted by the head to a rotary actuator arm and is selectively positioned by the actuator arm over a preselected data track of the disk to either read data from or write data to the preselected data track, as the disk rotates below the transducer. The head structure includes a slider having an air bearing surface that causes the transducer to fly above the data tracks of the disk surface due to fluid currents caused by rotation of the disk.

One part of the motors used in disk drives is the bearing. The basic fluid dynamic bearing involves parts which must move relative to one another, such as a shaft and a sleeve or a thrust plate and a housing, separated by a small gap filled with a viscous fluid such as oil. One characteristic of fluid dynamic bearings is stiffness, which is a measure of the amount of displacement per unit force applied to the rotating element. The force could be due to gravity, an imbalance in the rotating element, or some other source. Another characteristic of fluid dynamic bearings is drag, which refers to the torque required to rotate the rotating element at a rated speed.

One problem with the fluid dynamic bearing is that the stiffness of the bearing is very sensitive to changes in temperature. This is because the stiffness depends on the viscosity of the bearing fluid, and the viscosity of the bearing fluid typically changes with temperature. The bearing drag is proportional to viscosity, and also varies significantly with temperature. In certain applications, such as the use of the fluid dynamic bearing in a disk drive motor, the bearing must operate over a wide range of temperature. As a result, a fluid dynamic bearing with adequate stiffness at one temperature will have a stiffness which is too high at lower temperatures, and too low at higher temperatures, making the fluid dynamic bearing unsuitable for such an application. The same problem occurs with respect to drag.

Prior art fluid dynamic bearings have the problem that stiffness and/or drag are highly dependent on temperature, making conventional fluid dynamic bearings unsuitable for certain applications, such as use in disk drives, VCR helical scanners, gyros, and other rotating devices. There is a need for a fluid dynamic bearing with a reduced dependence of stiffness and/or drag on temperature.

SUMMARY OF THE INVENTION

The present invention solves the problem of temperature dependence of stiffness and/or drag in fluid dynamic bearing by making the different parts of the bearing from materials with different coefficients of thermal expansion. The materials from which the bearing is made can be chosen such that the fluid gap decreases as temperature increases. A bearing with a small gap has a higher stiffness and drag than a bearing with a larger gap. This effect can be used to offset the effect of the change in stiffness and/or drag due to the change in the viscosity of the fluid with temperature. Careful choice of bearing materials can decrease or even reverse the temperature dependence of stiffness and/or drag. This reduction in temperature dependence of stiffness and drag allows fluid dynamic bearings to be used for applications for which they were not well suited before the present invention, such as use in disk drives, VCR helical scanners, gyros, and other rotating devices.

DETAILED DESCRIPTION

Figure 1:
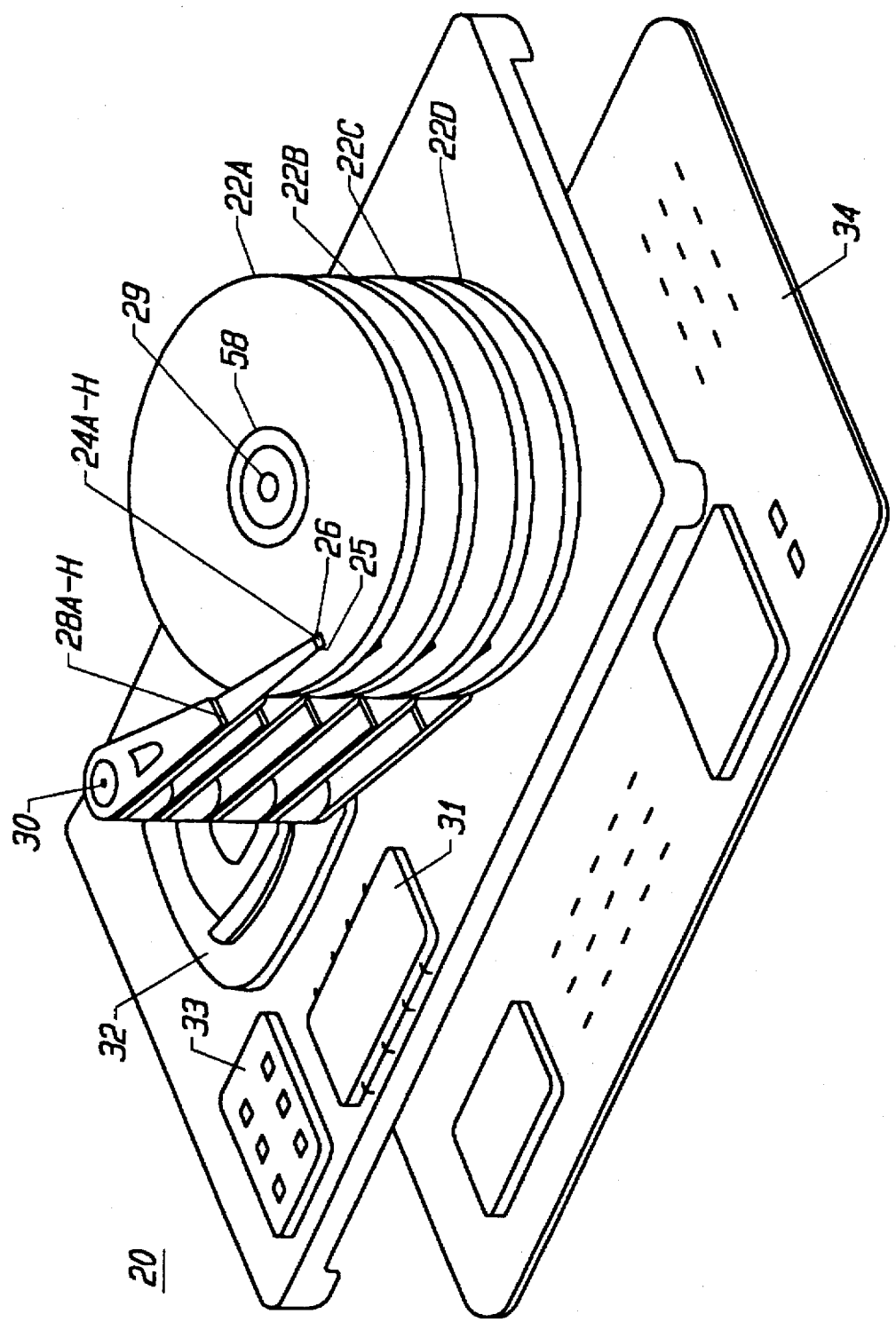
FIG. 1 is a perspective view of an exemplary disk drive.

Referring to FIG. 1, there is illustrated an example of a disk drive designated generally by reference number 20. Disk drive 20 includes a stack of storage disks 22a–d and a stack of read/write heads 24a–h. Each storage disk 22a–d is provided with a plurality of data tracks to store user data. As illustrated in FIG. 1, one head 24a–h is provided for each surface of each disk 22a–d such that data can be read from or written to data tracks on both sides of each storage disks 22. It should be understood that disk drive 20 is merely representative of a disk drive system utilizing the present invention and that the present invention can be implemented in a disk drive system including more or less storage disks 22.

Heads 24 are coupled to a pre-amplifier 31. During a read operation, electrical signals transduced by the transducer from the magnetic transitions on the disk surface, are processed by pre-amplifier 31 and transmitted to read/write channel circuitry in the disk drive for eventual transmission to a host computer using the disk drive to store data. During a write operation, electrical signals representative of data are received by the read/write channel from the host computer for transmission to pre-amplifier 31. Pre-amplifier 31 includes a write driver electrically coupled to the head transducer to transmit the signals corresponding to the data to the head. The head is responsive to the signals received from the write driver to conduct an electric signal and thereby cause magnetic transitions on the disk surface that correspond to the data.

Storage disks 22a–d are mounted for rotation by a spindle motor arrangement 29. An actuator assembly 30 supports read/write heads 24a–h. Each head 24a–h is mounted on an actuator arm 28a–h for controlled positioning over preselected radii of storage disks 22a–d to enable the reading and writing of data from and to selected data tracks. To that end, actuator assembly 30 is rotatably mounted on board 21, and a voice coil motor 32 controllably rotates actuator arms 28a–h radially across the disk surfaces.

Each read/write head 24a–h is mounted to a respective actuator arm 28a–h by a flexure element (not shown) and comprises a magnetic transducer 25 mounted to a slider 26 having an air bearing surface (not shown), all in a known manner. As typically utilized in disk drive systems, sliders 26 cause magnetic transducers 25 of read/write heads 24a–h to "fly" above the surfaces of the respective storage disks 22a–d for non-contact operation of the disk drive system, as discussed above. When not in use, voice coil motor 32 rotates actuator arms 28a–h during a contract stop operation, to position read/write heads 24a–h over a respective landing zone 58 or 60 (see FIG. 2), where read/write heads 24a–h come to rest on the storage disk surfaces. As should be understood, each read/write head 24a–h is at rest on a respective landing zone 58 or 60 at the commencement of a contact start operation. A printed circuit board (PCB) 34 is provided to mount control electronics for controlled operation of spindle motor 29 and voice coil motor 32. PCB 34 also includes read/write channel circuitry coupled to read/write heads 24a–h via pre-amplifier 31, to control the transfer of data to and from the data tracks of storage disks 22a–d. The manner for coupling PCB 34 to the various components of the disk drive is well known in the art, and includes a connector 33 to couple the read/write channel circuitry to pre-amplifier 31.

Figure 2:
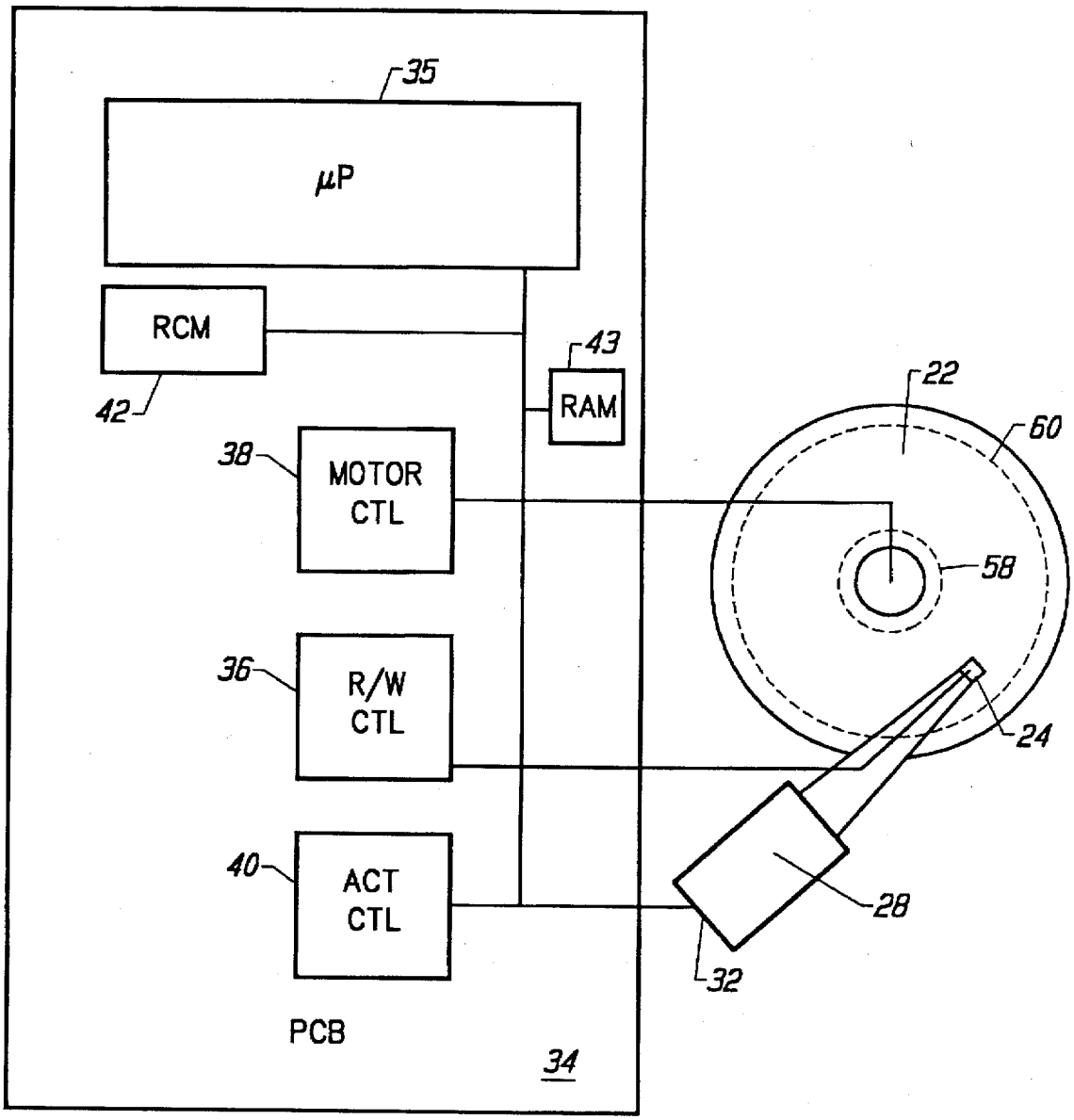
FIG. 2 is a top plan view of the printed circuit board of the disk drive of FIG. 1

Referring now to FIG. 2, there is illustrated in schematic form PCB 34 and the electrical couplings between the control electronics on PCB 34 and the components of the disk drive system described above. A microprocessor 35 is coupled to each of a read/write control 36, a spindle motor control 38, an actuator control 40, ROM 42 and RAM 43. In modern disk drive designs, microprocessor 35 can comprise a digital signal processor (DSP). Microprocessor 35 sends data to and receives data from storage disks 22a–d via read/write control 36 and read/write heads 24a–h.

Microprocessor 35 also operates according to instructions stored in ROM 42 to generate and transmit control signals to spindle motor control 38 and actuator control 40. Spindle motor control 38 is responsive to control signals received from microprocessor 35 to generate and transmit a drive voltage to spindle motor 29 to cause storage disks 22a–d to rotate at an appropriate rotational velocity.

Similarly, actuator control 40 is responsive to control signals received from microprocessor 35 to generate and transmit a voltage to voice coil motor 32 to controllably rotate read/write heads 24a–h, via actuator arms 28a–h, to preselected radial positions over storage disks 22a–d. The magnitude and polarity of the voltage generated by actuator control 40, as a function of the microprocessor control signals, determines the radial direction and speed of read/write heads 24a–h.

When data to be written or read from one of the storage disks 22a–d are stored on a data track different from the current radial position of read/write heads 24a–h, microprocessor 35 determines the current radial position of read/write heads 24a–h and the radial position of the data track where read/write heads 24a–h are to be relocated. Microprocessor 35 then implements a seek operation wherein the control signals generated by microprocessor 35 for actuator control 40 cause voice coil motor 32 to move read/write heads 24a–h from the current data track to a destination data track at the desired radial position.

When the actuator has moved read/write heads 24a–h to the destination data track, a multiplexor (not shown) is used to couple the head 24a–h over the specific datatrack to be written or read, to the read/write control 36, as is generally known in the art. Read/write control 36 includes a read channel that, in accordance with modern disk drive design, comprises an electronic circuit that detects information represented by magnetic transitions recorded on the disk surface within the radial extent of the selected data track. As described above, each data track is divided into a number of individual data sectors.

RAM 43 can be used to buffer data read from or to be written to the data sectors of storage disks 22a–d via read/write control 36. The buffered data can be transferred to or from a host computer that is utilizing the disk drive for data storage.

Figure 3:
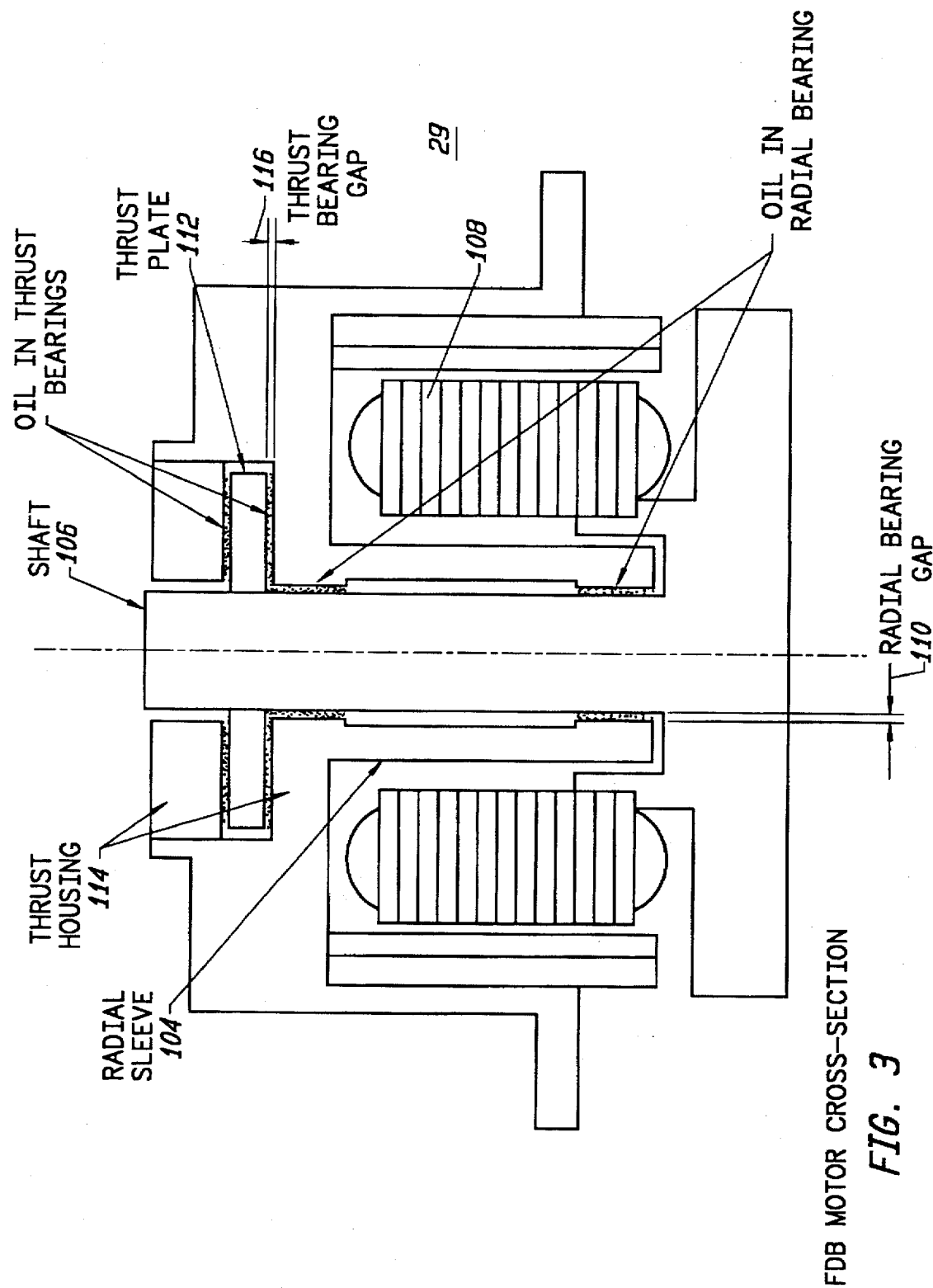
FIG. 3 is a cross section of a motor using a fluid dynamic bearing.

FIG. 3 shows a motor 29 in detail. Rotation is imparted to radial sleeve 104 relative to shaft 106 by a set of coils 108 in a known manner. Shaft 106 can be stationary, with sleeve 104 rotating around, and relative to, shaft 106, or sleeve 104 can be stationary, with shaft 106 rotating within, and relative to, sleeve 104. A radial bearing gap 110 separates radial sleeve 104 from shaft 106. For lubrication purposes, oil is present in radial bearing gap 110. A thrust plate 112 is fixed to shaft 06, and a thrust plate housing 114 is fixed to radial sleeve 104. Thrust plate housing 114 rotates around and relative to thrust plate 112 and serves to prevent shaft 106 from moving in an axial direction. A thrust bearing gap 116 separates thrust plate 112 from thrust plate housing 114. For lubrication purposes, oil is present in thrust bearing gap 116.

Figure 4:
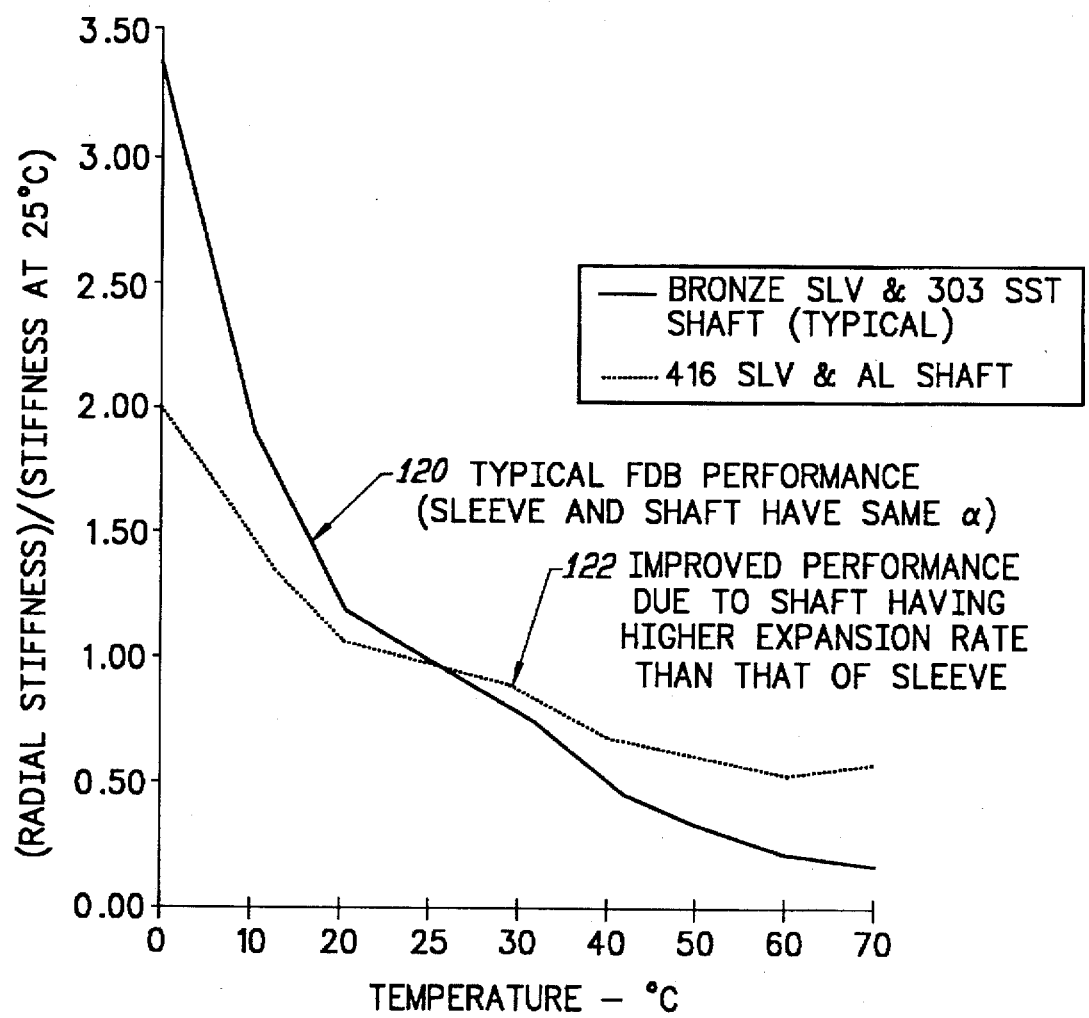
FIG. 4 is a graph showing the temperature dependence of the radial stiffness of the motor of FIG. 3 both with and without the present invention.

FIG. 4 is a graph of radial stiffness vs. temperature, normalized to a stiffness of 1 at 25 C. The graph is based on first order calculation data. A solid line 120 shows the temperature-stiffness relationship for motor 29 where sleeve 104 and thrust housing 114 are made of bronze, shaft 106 and thrust plate 112 are made of 303 SST ("303 SST" is an AISE standard, well known in the industry, which refers to a particular composition of stainless steel; similarly, a "300 series" steel refers to those steel compositions designated by numbers greater than or equal to 300 and less than 400), and both materials have approximately the same coefficient of thermal expansion. Line 120 represents a near matching of the coefficients of thermal expansion that is typical in the prior art. A dotted line 122 shows the temperature-stiffness relationship where sleeve 104 and thrust plate housing 114 are made of 416 SST with a coefficient of thermal expansion (henceforth $\alpha$) of $10 \times 10^{-6}$ /C, and shaft 106 and thrust plate 112 are made of aluminum with $\alpha = 23 \times 10^{-6}$ /C, such that shaft 106 and thrust plate 112 have a higher coefficient of thermal expansion than sleeve 104 and thrust plate housing 114.

Line 122 has a less pronounced temperature dependence than line 120. This is because radial bearing gap 110 and thrust bearing gap 116 of the motor 29 represented by line 122 decrease with increasing temperature due to the fact that the coefficient of thermal expansion of shaft 106 and thrust plate 112 is higher than that of radial sleeve 104 and thrust housing 114. This decrease in gaps 110 and 116 tends to increase the radial stiffness of motor 29, partially offsetting the decrease in stiffness due to a decrease in oil viscosity. Line 120 can be looked upon as a control variable, depicting the temperature-stiffness relationship of motor 29 in the absence of temperature dependent gaps 110 and 116.

A wide variety of materials with different coefficients of thermal expansion are available for implementation of the present invention. These materials include, but are not limited to, fluorocarbon FEP with $\alpha=189\times10^{-6}/°C$., polyimide with graphite filler (SP-21 Vespel manufactured by DuPont) with $\alpha=47\times10^{-6}/°C$., 303 stainless steel with $\alpha=17\times10^{-6}/°C$., other 300 series stainless steels, 416 stainless steel with $\alpha=10\times10^{-6}/°C$., other 400 series stainless steels, alumina with $\alpha=8\times10^{-6}/°C$., carbides with nitrides with $\alpha=3-8\times10^{-6}/°C$., and graphites with $\alpha=0-5\times10^{-6}/°C$. Other suitable materials can be used to achieve any desired combination of coefficients of thermal expansion within a range of $\alpha=-1$ through $200\times10^{-6}/°C$. According to an embodiment of the present invention, two particular materials are chosen having different coefficients of thermal expansion to achieve a desired temperature dependence of stiffness and drag.

Figure 5:
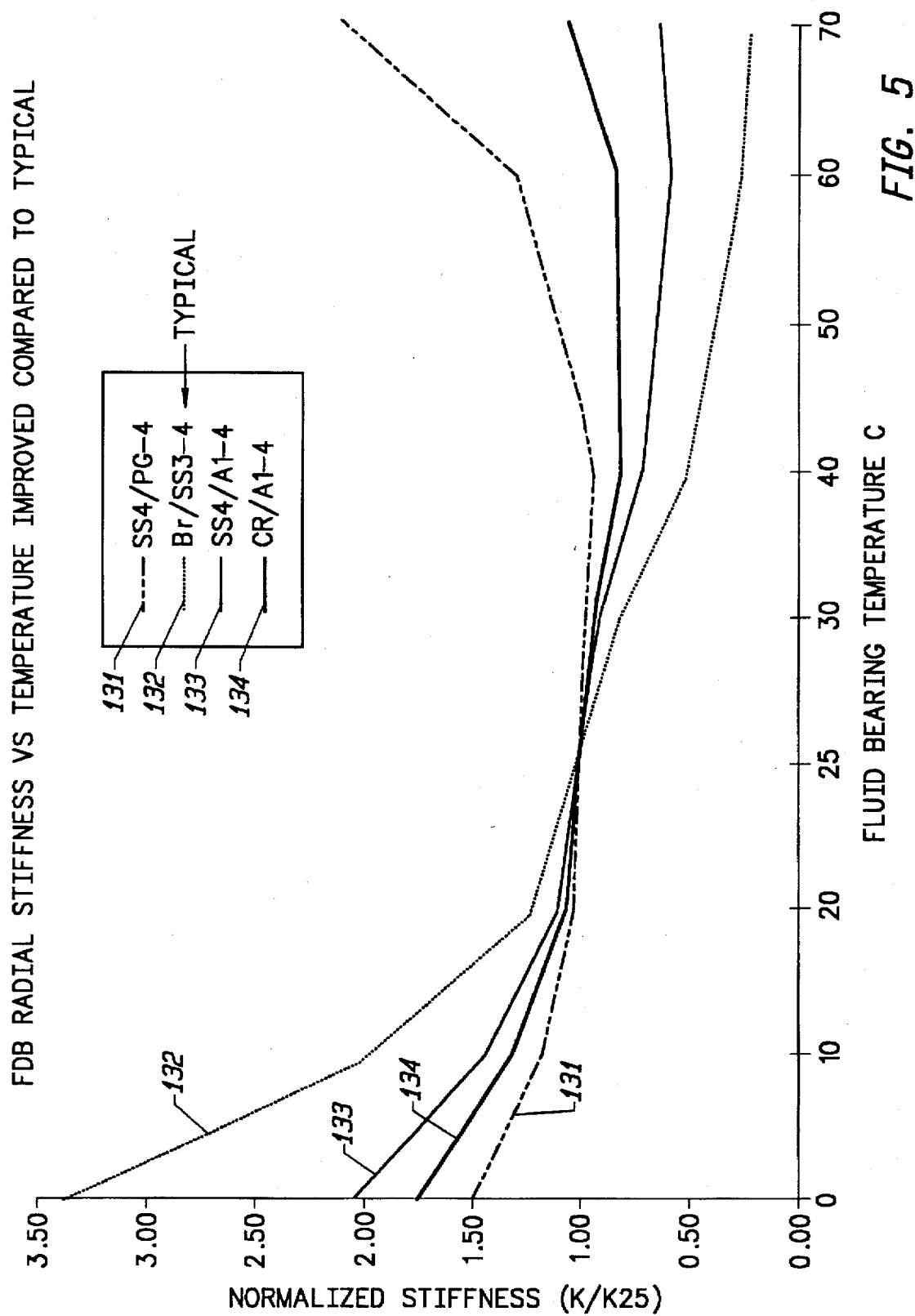
FIG. 5 is a graph showing the temperature dependence of the radial stiffness of the motor of FIG. 3 with a variety of different combinations of materials.

FIG. 5 is a graph of radial stiffness vs. temperature, normalized to a stiffness of 1 at 25° C., similar to that of FIG. 4, but showing the temperature-stiffness relationship for a wider variety of materials for sleeve 104, shaft 106, thrust plate 112, and thrust housing 114. Line 132 represents a typical prior art system, where sleeve 104, shaft 106, thrust plate 112, and thrust housing 114 have approximately the same coefficient of thermal expansion. Lines 131, 133, and 134 show cases where shaft 106 and thrust plate 112 are made of the material with a higher coefficient of thermal expansion, while sleeve 104 and thrust housing 114 are made of the material with a lower coefficient of thermal expansion, such that radial bearing gap 110 an thrust bearing gap 114 decrease as temperature increases. The wide variety of results in FIG. 5 show that it is possible to manipulate the temperature-stiffness relationship of the fluid dynamic bearing through careful choice of material, obtaining an almost constant stiffness over a range of temperatures, or even an increasing stiffness with increasing temperature.

In particular, a line 131 shows the temperature, stiffness relationship where sleeve 104 and thrust plate housing 114 are made of 416 SST with $\alpha=10\times10^{-6}/°C$., shaft 106 and thrust plate 112 are made of polyimide with graphite filler with $\alpha=34\times10^{-6}/°C$., and radial bearing gap 110 is 4 microns at 25° C. A line 132, typical of the prior art, shows the temperature-stiffness relationship where sleeve 104 and thrust plate housing 114 are made of bronze with $\alpha=18\times10^{-}$ $^{6}/°C$., and radial bearing gap 110 is 4 microns at 25° C. A line 133 shows the temperature-stiffness relationship where sleeve 104 and thrust plate housing 114 are made of 416 SST with $\alpha=10\times10^{-6}/°C$., shaft 106 and thrust plate 112 are made of aluminum with $\alpha=23\times10^{-6}/°C$., and radial bearing gap 110 is 4 microns at 25° C. A line 134 shows the temperature-stiffness relationship where sleeve 104 and thrust plate housing 114 are made of carbide with $\alpha=4.9\times10^{-6}/°C$., shaft 106 and thrust plate 112 are made of aluminum with $\alpha=23\times10^{-6}/°C$., and radial bearing gap 110 is 4 microns at 25° C.

Figure 6:
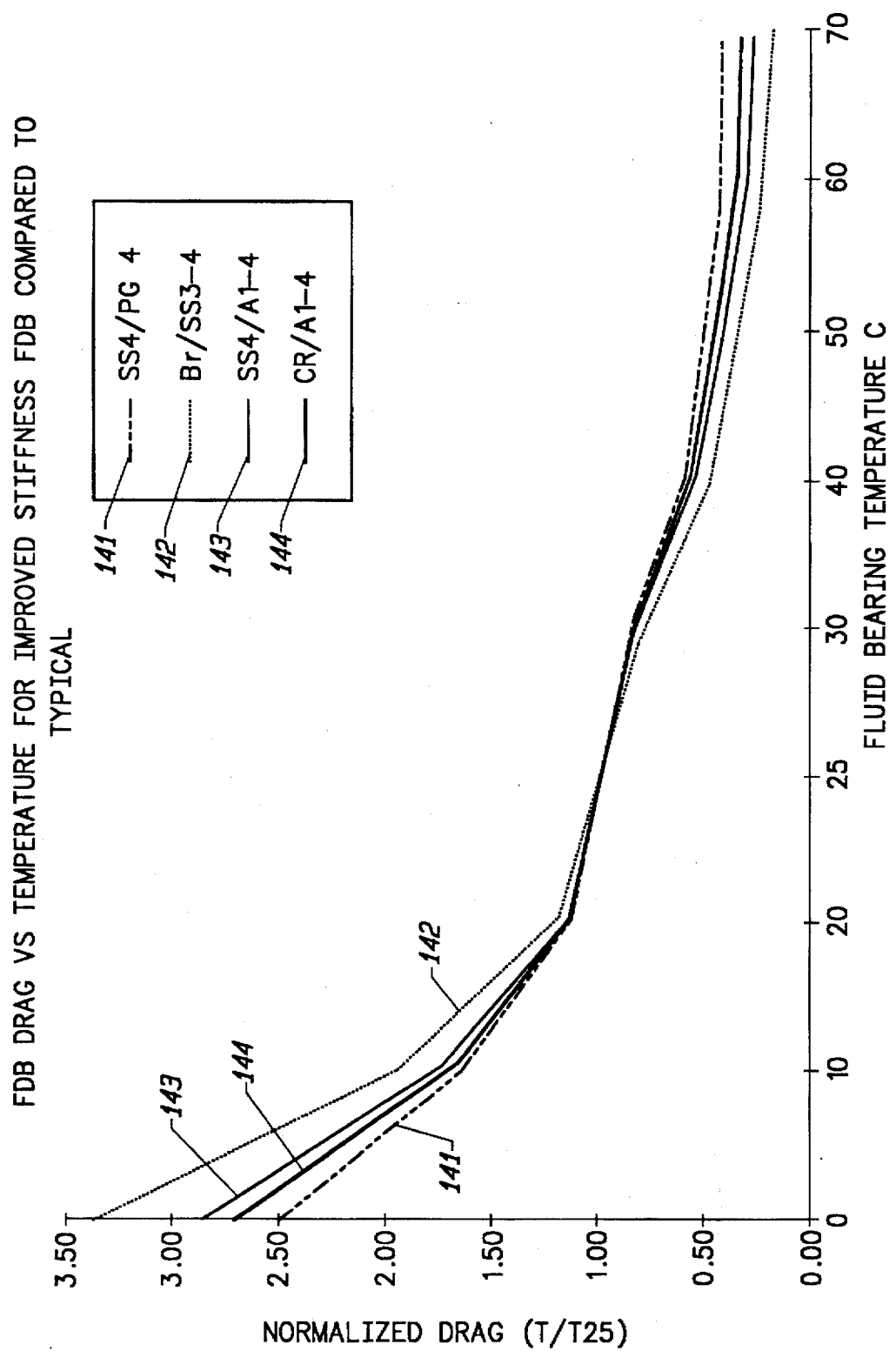
FIG. 6 is a graph showing the temperature dependence of the drag of the motor of FIG. 3 with a variety of different combinations of materials.

FIG. 6 is a graph of fluid dynamic bearing drag vs. temperature, normalized to a drag of 1 at 25° C., for the motors from which the temperature-stiffness relationships are shown in FIG. 5. Note once again that a desired result can be selected from a wide variety of possible temperature-drag relationships, and that the material and geometry choices of lines 141, 142, 143, and 144 correspond to those for lines 131, 132, 133, and 134 respectively.

In particular, a line 141 shows the temperature-drag relationship where sleeve 104 and thrust plate housing 114 are made of 416 SST with $\alpha=10\times10^{-6}/°C$., shaft 106 and thrust plate 112 are made of polyimide with graphite filler with $\alpha=34\times10^{-6}/°C$., and radial bearing gap 110 is 4 microns at 25° C. A line 142, typical of the prior art, shows the temperature-drag relationship where sleeve 104 and thrust plate housing 114 are made of bronze with $\alpha=18\times10^{-6}/°C$., shaft 106 and thrust plate 112 are made of 303 SST with $\alpha=17\times10^{-6}/°C$., and radial bearing gap 110 is 4 microns at 25° C. A line 143 shows the temperature-drag relationship where 104 and thrust plate housing 114 are made of 416 SST with $\alpha=10\times10^{-6}/°C$., shaft 106 and thrust plate 112 are made of aluminum with $\alpha=23\times10^{-6}/°C$., and radial bearing gap 110 is 4 microns at 25° C. A line 144 shows the temperature-drag relationship where sleeve 104 and thrust plate housing 114 are made of carbine with $\alpha=23\times10^{-6}/°C$., shaft 106 and thrust plate 112 are made of aluminum with $\alpha=23\times10^{-6}/°C$., and radial bearing gap 110 is 4 microns at 25° C. One skilled in the art will note that a preferable decreased temperature dependence of stiffness and drag is achieved when the difference in $\alpha$ values is between 5 and 200.

For purposes of obtaining a low temperature dependence of stiffness and drag, lines 131 and 141, for example, utilizing the present invention, show a dramatic improvement over lines 132 and 142, typical of the prior art. The normalized stiffness represented by line 131 varies between 1.1 and 2.1 in the temperature range modeled, 0° C. through 70° C., while the normalized stiffness represented by line 132 varies between 0.25 and 3.3. Similarly, the normalized drag represented by line 141 varies between 0.5 and 2.5, while the normalized drag represented by line 142 varies between 0.25 and 3.3. An appreciably favorable decrease in the temperature dependence of stiffness and drag is achieved when the $\alpha$ value for shaft 106 and thrust plate 112 are between $13\times10^{-6}/°C$. and $24\times10^{-6}/°C$. greater than the $\alpha$ value for sleeve 104. The most marked reductions in the temperature dependence of stiffness and drag were achieved using an $\alpha$ value for shaft 106 and thrust plate 112 that is $24\times10^{-6}/°C$. greater than the $\alpha$ value of sleeve 104.

Figure 7:
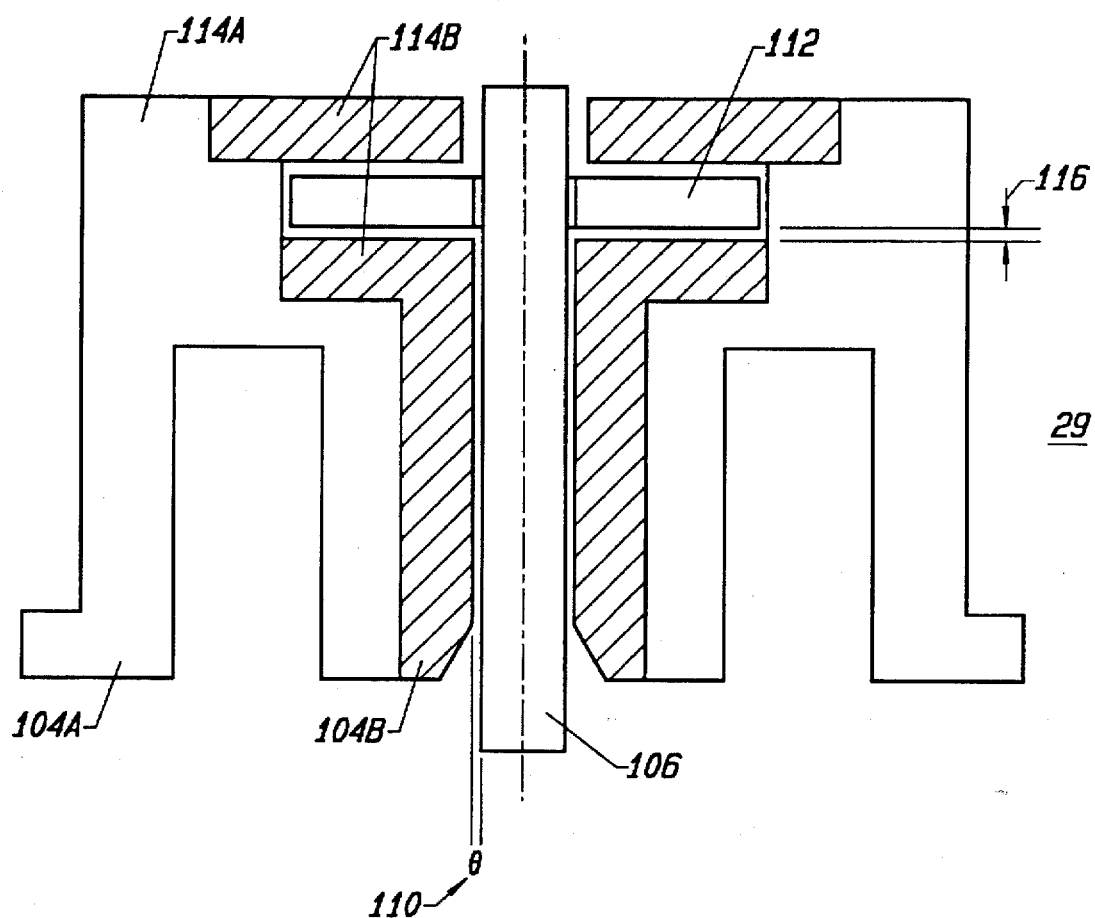
FIG. 7 is a cross section of a motor using an alternative embodiment of the present invention.

FIG. 7 shows an alternative embodiment of the invention where radial sleeve 104 and thrust housing 114 are made of outer portions 104a and 114a and inner portions 104b and 114b, where outer portions 104a and 114a have a coefficient of thermal expansion that is lower than that of inner portions 104b and 114b. When spindle motor 29 is heated, inner portions 104b and 114b thermally expand more than outer portions 104a and 114a. However, outer portions 104a and 114a constrain the outward expansion of inner portions 104b and 114b. As a result, inner portions 104b and 114b expand inward towards shaft 106 and thrust plate 112, leading to a decrease in radial bearing gap 110 and thrust bearing gap 116 and a corresponding increase in stiffness and drag with increasing temperature. The configuration shown in FIG. 7 is an embodiment of the present invention that is easy to manufacture, particularly if inner portions 104b and 114b are injection molded plastic parts that can be inserted into outer portions 104a and 114a.

What is claimed is:

1. A fluid dynamic bearing comprising:
    an inner element made of a first material with a first coefficient of thermal expansion;
    an outer element made of a second material with a second coefficient of thermal expansion surrounding said inner element;
    a layer of viscous fluid in contact with and separating said inner element from said outer element such that said outer element is capable of rotation relative to said inner element;
    wherein said first coefficient of thermal expansion is greater than said second coefficient of thermal expansion, such that a thickness of said layer of viscous fluid decreases as temperature increases.

2. The fluid dynamic bearing of claim 1 wherein said layer of viscous fluid has a viscosity that decreases as temperature increases causing a decrease in a stiffness of said bearing as temperature increases, and wherein said decrease in said thickness of said layer of viscous fluid causes an offsetting increase in said stiffness as temperature increases that at least partially counteracts said decrease in stiffness due to said decrease in viscosity.

3. The fluid dynamic bearing of claim 2 wherein said increase in said stiffness due to said decrease in thickness as temperature increases is greater than said decrease in said stiffness due to said decrease in viscosity as temperature increases.

4. The fluid dynamic bearing of claim 1 wherein said layer of viscous fluid has a viscosity that decreases as temperature increases causing a decrease in a drag of said bearing as temperature increases, and wherein said decrease in thickness of said layer of viscous fluid causes an offsetting increase in said drag as temperature increases that at least partially counteracts said decrease in drag due to said decrease in viscosity.

5. The fluid dynamic bearing in claim 2 wherein said increase in said drag due to said decrease in thickness as temperature increases is greater than said decrease in said drag due to said decrease in viscosity as temperature increases.

6. The fluid dynamic bearing of claim 1 wherein said first coefficient of thermal expansion falls within a range of approximately $-1$ of $10^{-6}/°C.$ to $200\times10^{-6}/°C.$, and wherein said second coefficient of thermal expansion falls within a range of approximately $-1\times10^{-6}/°C.$ to $200\times10^{-6}/°C.$ 7. The fluid dynamic bearing of claim 1 wherein said inner element is a shaft and said outer element is a radial sleeve.

8. The fluid dynamic bearing of claim 1 wherein said inner element includes a thrust plate and said outer element includes a thrust housing surrounding said thrust plate.

9. The fluid dynamic bearing of claim 1 wherein said fluid dynamic bearing is incorporated into a disk drive, and wherein at least one disk is fixed to said outer element.

10. The fluid dynamic bearing of claim 1 wherein said fluid dynamic bearing is incorporated into a VCR helical scanner.

11. The fluid dynamic bearing of claim 1 wherein said fluid dynamic bearing is incorporated into a gyro.

12. The fluid dynamic bearing of claim 1 wherein said first material is aluminum and said second material is 400 series stainless steel.

13. The fluid dynamic bearing of claim 1 wherein said first material is aluminum and said second material is carbide.

14. The fluid dynamic bearing of claim 1 wherein said first material is polyimide with graphite filler and said second material is carbide.

15. The fluid dynamic bearing of claim 1 wherein said first material is polyimide with graphite filler.

16. The fluid dynamic bearing of claim 1 wherein said first material is chosen from the group consisting of aluminum and bronze, and said second material is chosen from the group consisting of carbides and nitrides.

17. The fluid dynamic bearing of claim 1 wherein said first material is polyimide with graphite filler and said second material is a 400 series stainless steel.

18. The fluid dynamic bearing of claim 1 wherein said first coefficient of thermal expansion is greater than said second coefficient of thermal expansion by at least $5\times10^{-6}/°C.$ 19. the fluid dynamic bearing of claim 1 wherein said first coefficient of thermal expansion is greater than said second coefficient of thermal expansion by at least $13\times10^{-6}/°C.$

* * * * *